Patented Nov. 26, 1940

2,223,194

UNITED STATES PATENT OFFICE 2,223,194

RECOVERY OF PETROLEUM SULPHONIC COMPOUNDS

Kenneth M. Thompson, Aldan, Pa., assignor to The Atlantic Refining Company, Philadelphia, Pa., a corporation of Pennsylvania No Drawing. Application July 9, 1938,
Serial No. 218,364

9 Claims. (Cl. 260—504)

The present invention relates to an improved method for recovering water-soluble sulphonic acids from acid sludge produced in the treatment of relatively low-boiling petroleum oils such as naphtha, gasoline and gas oil with sulphuric acid or other sulphonating agent. The sulphonic acids recovered in accordance with this invention are water-soluble, and have molecular weights ranging from about 200 to about 300, and corresponding acid values of the order of 400 mg. KOH/gm. to 200 mg. KOH/gm. Such sulphonic acids may be converted by neutralization into salts and marketed in that state as detergents, wetting agents, spreaders and the like.

Heretofore a variety of methods have been proposed for the recovery of sulphonic compounds from sulphonated hydrocarbon mixtures, the most successful of which I have employed consisting essentially in extracting from acid sludge water-soluble sulphonic acids with an organic solvent such as benzol, then extracting from the benzol solution water-soluble sulphonic acids by water washing, and thereafter neutralizing the resulting aqueous solution with caustic soda and evaporating the solution to dryness to recover the sodium sulfonates.

I have found that by modifying the above procedure, particularly in accordance with the present invention, I am able to markedly increase the yield of water-soluble sulphonic acids or salts recoverable from acid sludge; to increase the yield of spent sulphuric acid recoverable from the acid sludge; and to decrease the quantity of solvent employed in effecting recovery of the sulphonic acids.

In accordance with my invention acid-sludge resulting from the sulphuric acid treatment of relatively low-boiling petroleum oils such as naphtha, kerosene or gas oil is substantially separated from the treated oil by decantation or centrifuging. This acid sludge, containing water-soluble sulphonic acids and unreacted sulphuric acid, is then diluted with from about 2% to 20% by volume of water and with an organic solvent for the sulphonic acids, which solvent may comprise from about 5% to 100% by volume of the sludge. Organic solvents which may be suitably employed in accordance with my invention are exemplified by alcohol, benzol, toluol, nitrobenzene, carbon tetrachloride, ethylene dichloride and the like. The mixture of sludge, water and organic solvent is preferably agitated in order to insure intimate contact of the solvent with the sludge, and the mixture is thereafter permitted to settle and stratify, the organic solvent containing water-soluble sulphonic acids extracted from the sludge comprising one phase or layer, and dilute sulphuric acid comprising a second phase or layer. These phases or layers may be separated from one another by decantation or centrifuging, and that phase or layer comprising organic solvent containing water-soluble sulphonic acids may be subjected to one or more of the following treatments:

(a) The solution of water-soluble sulphonic acids in the organic solvent may be neutralized, preferably with an aqueous solution of an inorganic base such as sodium or potassium hydroxide or carbonate, and the organic solvent may be removed from the neutralized sulphonic acid salts by decantation, centrifuging and/or vaporization. The sulphonic salts may then be marketed or otherwise utilized either in the form of an aqueous solution, or in the crystalline or powder form, in the event that the water is evaporated from the aqueous salt solution.

(b) The solution of water-soluble sulphonic acids in the organic solvent may be washed with water in order to extract from the organic solvent its content of water-soluble organic acids. The aqueous solution of sulfonic acids may be separated from the organic solvent by decantation or centrifuging, and the solution may be neutralized with an inorganic base. In the event that solid sulphonic salts are desired, the water may be evaporated from the neutralized aqueous solution. This procedure is only employed when the organic solvent employed is immiscible with water.

(c) The solution of water-soluble sulphonic acids in the organic solvent may be heated to vaporize the solvent therefrom, or the solution may be washed with water to extract the sulphonic acids from the organic solvent, the organic solvent separated from the aqueous solution of sulphonic acids, and the latter heated to vaporize the water therefrom. In either case the product will be the free sulphonic acids substantially free of oil.

My invention may be further illustrated by the following example, which, however, is not to be construed as limiting the scope thereof.

(1) 2730 parts by weight of a gas oil having an A. P. I. gravity of 24° and a distillation range of 300° F. to 634° F. was treated with 2480 parts by weight of 98% sulphuric acid for a period of about 20 minutes at a temperature of about 140° F. The mixture was then permitted to settle and the acid sludge comprising diluted sulphuric acid, water-soluble petroleum sulphonic acids and a small amount of tar was separated from the unreacted, sour oil. As a result of such separation there was obtained 3330 parts by weight of acid sludge substantially free of oil and 1750 parts by weight of sour oil.

In accordance with my invention, 1665 parts by weight of said acid sludge was diluted with 232 parts by weight of water and 510 parts by weight of benzol, and the mixture was agitated and then permitted to settle. A two-layer system was formed and the layers were separated, the upper layer of benzol containing water-soluble acids amounting to 1440 parts by weight, and the lower layer of dilute sulphuric acid (67% concentration) amounting to 967 parts by weight. The benzol layer containing water-soluble sulphonic acids was washed with 1155 parts by weight of water and the resulting aqueous solution of sulphonic acids was separated from the benzol layer. The aqueous solution was neutralized with sodium hydroxide and the neutralized solution evaporated to dryness. The residue of sodium sulfonates thus produced amounted to 950 parts by weight.

By way of comparison, the remaining 1665 parts by weight of sludge from the acid treating process was diluted and agitated with 5075 parts by weight of benzol, and the resulting benzol solution of water-soluble petroleum sulphonic acids was separated from the extracted sludge. The benzol solution was then extracted with 1155 parts by weight of water and the aqueous solution of sulphonic acids was separated from the benzol. The aqueous solution, upon neutralization with sodium hydroxide and evaporation to dryness, yielded 309 parts by weight of sodium sulphonates.

It will be seen from the results given above that the yield of sodium petroleum sulphonates produced in accordance with my invention is markedly greater than that produced by the most successful of the conventional methods. In the event that it is desired to remove small amounts of sodium sulphate or sulphite which usually accompany the petroleum sulphonates, the crude sulphonates may be dissolved in a suitable solvent such as ethyl alcohol and the insoluble sulphates or sulphites separated therefrom by decantation or centrifuging.

What I claim is:

1. A method of recovering water-soluble sulphonic compounds from acid sludge resulting from the sulphuric acid treatment of relatively low boiling petroleum oil, which comprises admixing said sludge with from about 2% to about 20% by volume of water and with an organic solvent for the water-soluble sulphonic compounds contained in said sludge, allowing the admixture to settle and stratify into a layer comprising organic solvent containing dissolved water-soluble sulphonic compounds and a dilute sulphuric acid layer, and separating said layers from one another.

2. The method according to claim 1, wherein the organic solvent is of the group consisting of benzol and toluol.

3. A method of recovering water-soluble sulphonic compounds from acid sludge resulting from the sulphuric acid treatment of relatively low boiling petroleum oil, which comprises admixing said sludge with from about 2% to about 20% by volume of water and with an organic solvent for the water-soluble sulphonic compounds contained in said sludge, allowing the admixture to settle and stratify into a layer comprising organic solvent containing dissolved water-soluble sulphonic compounds and a dilute sulphuric acid layer, separating said layers from one another, and removing organic solvent from said sulphonic compounds.

4. A method of recovering water-soluble sulphonic compounds from acid sludge resulting from the sulphuric acid treatment of relatively low boiling petroleum oil, which comprises admixing said sludge with from about 2% to about 20% by volume of water and with an organic solvent for the water-soluble sulphonic compounds contained in said sludge, allowing the admixture to settle and stratify into a layer comprising organic solvent containing dissolved water-soluble sulphonic compounds and a dilute sulphuric acid layer, separating said layers from one another, and neutralizing the water-soluble sulphonic compounds contained in said organic solvent with an organic base.

5. The method according to claim 4, wherein the inorganic base is sodium hydroxide.

6. A method of recovering water-soluble sulphonic compounds from acid sludge resulting from the sulphuric acid treatment of relatively low boiling petroleum oil, which comprises admixing said sludge with from about 2% to about 20% by volume of water and with an organic solvent for the water-soluble sulphonic compounds contained in said sludge, allowing the admixture to settle and stratify into a layer comprising organic solvent containing dissolved water-soluble sulphonic compounds and a dilute sulphuric acid layer, separating said layers from one another, neutralizing the water-soluble sulphonic compounds contained in said organic solvent with an inorganic base and removing organic solvent from the neutralized sulphonic compounds.

7. A method of recovering water-soluble sulphonic compounds from acid sludge resulting from the sulfuric acid treatment of relatively low boiling petroleum oil, which comprises admixing said sludge with from about 2% to about 20% by volume of water and with a water-immiscible organic solvent for the water-soluble sulphonic compounds contained in said sludge, allowing the admixture to settle and stratify into a layer comprising organic solvent containing dissolved water-soluble sulphonic compounds and a dilute sulphuric acid layer, separating said layers from one another, and extracting from the organic solvent layer water-soluble sulphonic compounds by washing with water.

8. A method of recovering water-soluble sulphonic compounds from acid sludge resulting from the sulphuric acid treatment of relatively low boiling petroleum oil, which comprises admixing said sludge with from about 2% to about 20% by volume of water and with a water-immiscible organic solvent for the water-soluble sulphonic compounds contained in said sludge, allowing the admixture to settle and stratify into a layer comprising organic solvent containing dissolved water-soluble sulphonic compounds and a dilute sulphuric acid layer, separating said layers from one another, extracting from the organic solvent layer water-soluble sulphonic compounds by washing with water, and neutralizing the water extract of sulphonic compounds with an inorganic base.

9. A method of recovering water-soluble sulphonic compounds from acid sludge resulting from the sulphuric acid treatment of relatively low boiling petroleum oil, which comprises admixing said sludge with from about 2% to about 20% by volume of water and with a water-immiscible organic solvent for the water-soluble sulphonic compounds contained in said sludge, allowing the admixture to settle and stratify into a layer comprising organic solvent containing dissolved water-soluble sulphonic compounds and a dilute sulphuric layer, separating said layers from one another, extracting from the organic solvent layer water-soluble sulphonic compounds by washing with water, neutralizing the water extract of sulphonic compounds with an inorganic base, and removing water from the neutralized sulphonic compounds.

KENNETH M. THOMPSON.